United States Patent

Campbell

(10) Patent No.: US 10,793,051 B2
(45) Date of Patent: Oct. 6, 2020

(54) CABLE FOR SECURING CARGO IN VEHICLES WITH A LOCKING TAILGATE

(71) Applicant: 8th Commandment Cable Company, LLC, Vicksburg, MS (US)

(72) Inventor: Joseph Lane Campbell, Vicksburg, MS (US)

(73) Assignee: 8th Commandment Cable Company, LLC, Vicksburg, MS (US)

(*) Notice: Subject to any disclaimer, the term of this patent is extended or adjusted under 35 U.S.C. 154(b) by 138 days.

(21) Appl. No.: 16/212,767

(22) Filed: Dec. 7, 2018

(65) Prior Publication Data

US 2019/0210510 A1    Jul. 11, 2019

Related U.S. Application Data

(60) Provisional application No. 62/616,133, filed on Jan. 11, 2018.

(51) Int. Cl.
| | |
|---|---|
| *B60R 9/06* | (2006.01) |
| *B60R 11/06* | (2006.01) |
| *B60P 7/08* | (2006.01) |
| *B62D 33/03* | (2006.01) |
| *B62D 33/037* | (2006.01) |
| *B62D 33/027* | (2006.01) |

(52) U.S. Cl.
CPC .............. *B60P 7/0846* (2013.01); *B60P 7/08* (2013.01); *B60P 7/0807* (2013.01); *B60R 11/06* (2013.01); *B60R 9/065* (2013.01); *B62D 33/0273* (2013.01); *B62D 33/03* (2013.01); *B62D 33/037* (2013.01)

(58) Field of Classification Search
CPC . B60R 9/065; B60R 11/06; B60R 2011/0082; B60R 2011/0096; B60P 7/08; B60P 7/0846; B60P 7/0823; B60P 7/0807; B62D 33/03; B62D 33/0273; B62D 33/037; B62D 33/02
USPC .................................................... 70/416–421
See application file for complete search history.

(56) References Cited

U.S. PATENT DOCUMENTS

| | | | | |
|---|---|---|---|---|
| 5,768,920 A | * | 6/1998 | DeBevoise | E05B 73/0005 70/18 |
| 5,887,840 A | * | 3/1999 | Hoffman | B60P 7/0807 248/502 |
| 6,604,390 B1 | * | 8/2003 | Nooner | B65D 55/14 109/50 |
| 7,186,914 B1 | * | 3/2007 | Knight | B62H 5/003 174/50 |

(Continued)

*Primary Examiner* — Gregory A Blankenship
(74) *Attorney, Agent, or Firm* — John H. Thomas, P.C.

(57) ABSTRACT

The vehicle for use with the present system is a pickup truck or other work truck with an open cargo space. The cargo space is typically defined by a rectangular bed surrounded by fixed walls on three sides and a tailgate in the rear of the vehicle. The bottom of the cargo space is referred to as the floor or cargo bed floor. Cargo pillars are positioned at the two back corners of the cargo bed. They are also the structural support for a tailgate. The bottom of the tailgate is rotatably connected to the base of the pillars next to the cargo bed floor. When the tailgate is open or down, it is typically about parallel to the cargo bed floor. When the tailgate is up or closed, it is latched or locked to the upper end of the pillars. A fixed or retractable cable strap, chain, rope, or similar line is adapted to be locked together with the locking of a truck tailgate.

12 Claims, 15 Drawing Sheets

(56) References Cited

U.S. PATENT DOCUMENTS

| | | | |
|---|---|---|---|
| 7,428,833 B2 * | 9/2008 | Tollefson | B60D 1/60 70/14 |
| 10,518,693 B2 * | 12/2019 | Moua | B60P 7/0853 |
| 2012/0263552 A1 * | 10/2012 | Hooton | B60P 7/083 410/96 |
| 2017/0113595 A1 * | 4/2017 | Hemphill | B60P 7/0807 |
| 2017/0361756 A1 * | 12/2017 | Marchlewski | B62D 33/023 |
| 2019/0210507 A1 * | 7/2019 | Reiners | B60P 7/0807 |
| 2019/0210510 A1 * | 7/2019 | Campbell | B60P 7/0807 |
| 2019/0225137 A1 * | 7/2019 | Williams | B60P 7/0807 |
| 2019/0337441 A1 * | 11/2019 | Marchlewski | B60P 7/0807 |
| 2020/0062167 A1 * | 2/2020 | Campbell | B62D 33/0273 |

* cited by examiner

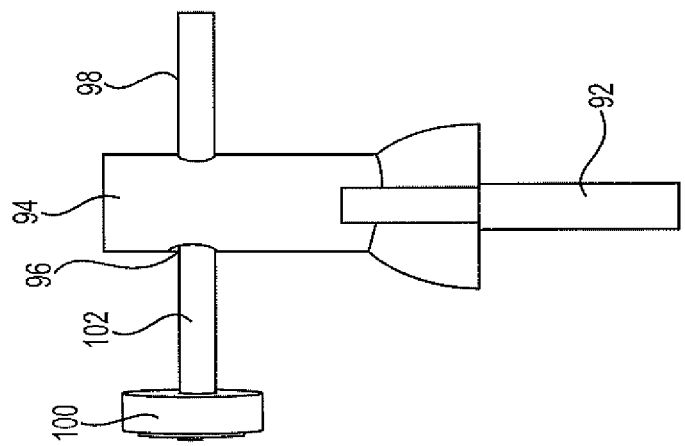
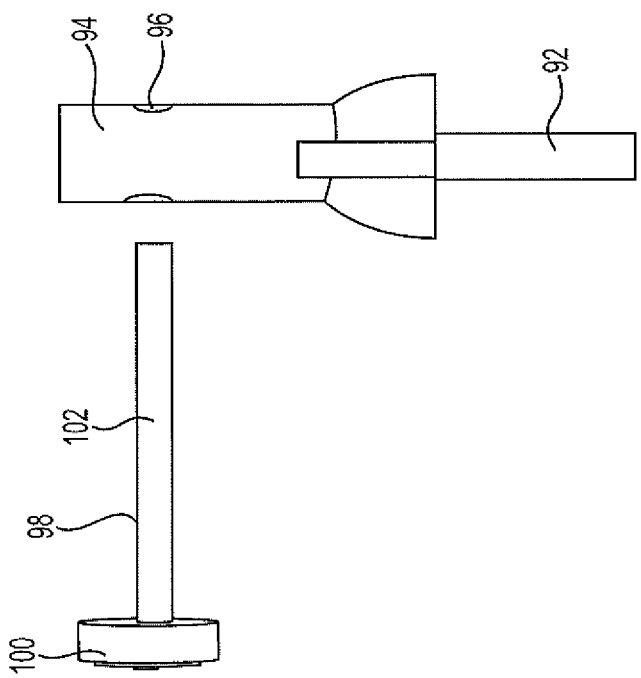
FIG. 10

CABLE FOR SECURING CARGO IN VEHICLES WITH A LOCKING TAILGATE

This application claims the benefit of filing of U.S. Provisional Patent Application No. 62/616,133 filed Jan. 11, 2018, which is incorporated by reference herein in its entirety.

The present invention is directed to the use of a cable, strap, chain, rope, or similar line for use in securing cargo in a vehicle cargo bed, and especially in a cargo bed that has a locking tailgate.

BACKGROUND

Some vehicles like utility vehicles, pickup trucks and work trucks most often have open cargo beds. These cargo beds enable easy access for loading and unloading many different items. This easy and open accessibility, however, has its problems. Specifically, items placed in an open cargo bed are easy targets for theft. More generally, unsecured cargo can be blown from the bed area of a vehicle at speed.

Several well-known countermeasures are available to help prevent theft. The first solution is the classic toolbox that can be mounted across a bed or down one or both sides of a bed. In-bed mounted toolboxes are effective anti-theft devices, but they take up a large amount of valuable cargo space. A second answer is a cargo bed cover, that has an additional benefit of being a weather protector to items placed on the cargo bed. These bed covers, however, are expensive and often easy to breach, they limit the height of the cargo that may be transported, and they are bulky and can take up considerable space in the cargo bed. Finally, there are many cargo-specific devices such as for instance bicycle carriers and motor cycle carriers that can be mounted in a bed and used. Again, these are bulky and can be difficult to handle.

SUMMARY

Accordingly, it is an object to overcome the shortcomings of existing devices that help protect items from theft by providing a fixed or retractable cable strap, chain, rope, or similar line that is adapted to be locked and secured by the closing and the locking of a vehicle tailgate.

In one example, a retractable cable locking system for use with vehicles having a tailgate comprises a vehicle having a cargo bed, wherein the cargo bed has a tailgate mounted on one end of the cargo bed and the tailgate having rotating down and latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed. The system also includes a cable spool comprising a length of cable or similar line retractably configured in the spool, wherein a first end of the cable that is movable away from and back into the spool, and a second end of the cable that is fixed inside the spool. A lug is fixed onto the first end of the cable, the lug having a first size and shape. The cable spool is attached behind a wall in the cargo bed. The system also includes a first hole in the cargo bed substantially the same size and shape as the first size and shape as the lug, thereby allowing the lug and cable to unwind from retract into the cable spool in a cargo space in the cargo bed. The lug has a second hole across its width, and the cargo bed pillar comprises a lug hole across its width. At least one of the cargo bed pillars has a lug hole therein in a side face of the cargo bed pillar, and this side face of the cargo bed pillar is still open when the tailgate is closed. The system further includes a lock pin having a pin body with a second size and shape and a pin head that is larger than the pin body. The cargo bed pillar having the lug hole in it also has a pin hole in it that is positioned about the same height on the pillar as the lug hole, wherein the pin hole passes through a back face of the pillar and the forward face of the pillar and is substantially the same size and shape as the second size and shape of the lock pin, whereby the pin body is sized to pass through the second hole and across the width of the lug, whereby a cable pulled from the cable spool and the lug may be inserted into the lug hole and the lock pin is inserted into the pin hole and through the second hole of the lug and then the pin is locked in the pillar when the tailgate is closed. The cable spool may be fixed underneath the floor of the cargo bed. A tool box may be mounted in the cargo bed, and wherein the cable spool is fixed inside the tool box. The lug can be round in cross-section, or alternatively rectangular in cross-section. The locking pin head may have a compressible, scratch-resistant coating. The pin body may be round in cross-section, or alternatively the pin body may be rectangular in cross-section, and the second hole in the lug has substantially the same cross-section. The cargo bed pillar may have a plurality of lug holes in its vertical height and a corresponding number of pin holes mounted along the corresponding positions as the lug holes along the vertical height of the cargo bed pillar.

In another example, a cable locking system for use with vehicles having a tailgate comprises a vehicle having a cargo bed, wherein the cargo bed has a tailgate mounted on one end of the cargo bed and the tailgate having rotating down and latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed. The system includes a length of cable with a lug fixed onto the first end of the cable, the lug having a first size and shape, and a second end of the cable fixed to the vehicle, wherein the lug has a hole across its width. The cargo bed pillar comprises a lug hole across the cargo bed pillar width, wherein the lug hole is in an inside face of the cargo bed pillar, and this inside face of the cargo bed pillar is still open when the tailgate is closed. The system also includes a lock pin having a pin body with a second size and shape and a pin head that is larger than the pin body, wherein the cargo bed pillar having the lug hole in it also has a pin hole in it that is positioned about the same height on the pillar as the lug hole, wherein the pin hole passes through a back face of the pillar and the forward face of the pillar and is substantially the same size and shape as the second size and shape of the lock pin, whereby the pin body is sized to pass through the second hole and across the width of the lug, whereby the cable lug may be inserted into the lug hole and the lock pin is inserted into the pin hole and through the hole of the lug and then the pin is locked in the pillar when the tailgate is closed. A tool box may be mounted in the cargo bed, and wherein the cable is fixed inside the tool box. The cargo bed pillar may have a plurality of lug holes in its vertical height and a corresponding number of pin holes mounted along the corresponding positions as the lug holes along the vertical height of the cargo bed pillar.

BRIEF DESCRIPTION OF THE DRAWINGS

FIG. 10 is two perspective views of a first lug and pin combination as described herein.

DETAILED DESCRIPTION

Figure 1:
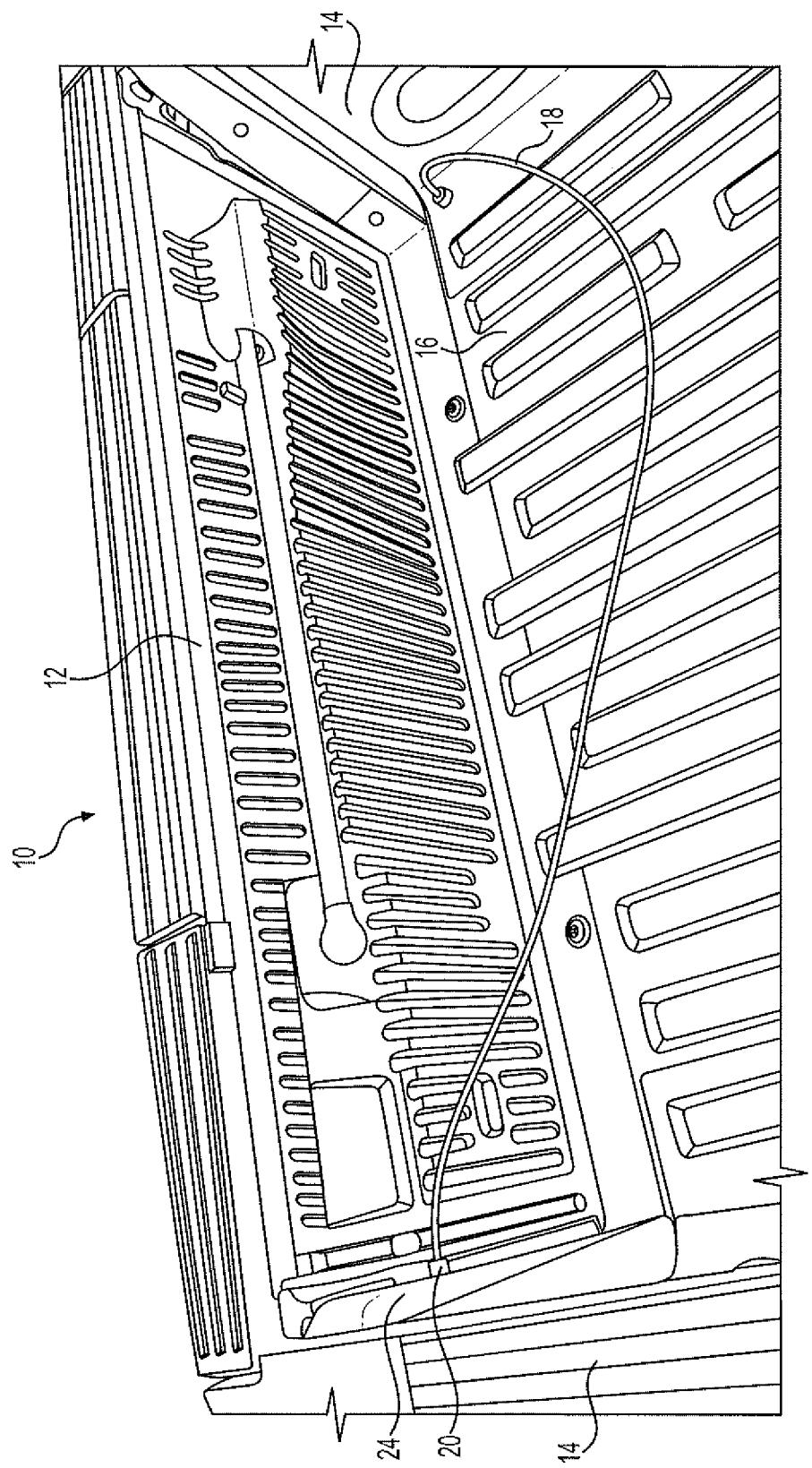
FIG. 1 is a perspective view of the back portion of a vehicle cargo bed showing also a cable as described herein.

Some vehicles, especially many modern pickup trucks, similar work trucks, utility vehicles, and all-terrain vehicles have lockable tailgate systems. The present securing systems takes advantage of a locking tailgate so that the process of locking the tailgate will also lock a retractable locking cable, or similar line, device that may secure cargo in the cargo bed of the truck. The system uses a retractable or fixed spool of cable where the cable can be unwound and used as a locking device, or the cable can be retracted and substantially out of a work space in the truck cargo bed.

The vehicle for use with the present system is a pickup truck or other work truck with an open cargo space. As noted earlier, easy access to a cargo bed means easy use but also easy mischief for a thief or vandal or susceptible to simply being blown out of the cargo area of a vehicle at speed. The cargo space is typically defined by a rectangular bed surrounded by fixed walls on three sides and a tailgate in the rear of the vehicle. The bottom of the cargo space is referred to as the floor or cargo bed floor. Cargo pillars are positioned at the two back corners of the cargo bed. The pillars help support the respective sidewalls. They are also the structural support for the tailgate. The bottom of the tailgate is rotatably connected to the base of the pillars next to the cargo bed floor. When the tailgate is open or down, it is typically about parallel to the cargo bed floor. When the tailgate is up or closed, it is latched or locked to the upper end of the pillars.

The spool is a retractable reel of flexible and strong cable. The spool may have different lengths of cable wound up therein. For the purposes of the present system, there is typically about 6 to 30 or more feet of cable, or alternatively about 12 to 25 feet of cable. The cable may be formed of a coated steel or other metal braid or other flexible material. The cable can have a cross-sectional thickness of about one-eighth to one-half of an inch or other thickness as appropriate for the flexible cable.

A lug is fixed to the end of the cable that may be retracted from the spool. The opposite end of the cable from the lug is fixed to the inside of the spool. The lug is a rigid piece with a hole across its width in substantially the middle of the lug and perpendicular to the longitudinal length of the cable and lug combination. The lug is typically formed of steel or aluminum or other rigid metal, but it may also be formed of a strong polymer or composite material.

The lug may be any shape. The lug is the piece that will be inserted into a hole as a part of the locking mechanism, so it will have a shape appropriate for the hole engineered to receive it. The lug may, for instance, be round or octagonal or square in cross-section. The lug may have a longitudinal length of about 1 to 4 inches, or alternatively about 2 to 3 inches.

A pin is adapted to interact with the lug. The pin will have a relatively thin and longer body portion with a cross-sectionally larger and thin head portion. The head portion may be coated with a compressible, scratch-resistant coating, for example a rubber or silicone or similar product. The pin is adapted to be inserted through the hole across the lug, so the shape and size of the pin will be generally similar to or at least able to be inserted through the hole in the lug. The pin is typically formed of steel or aluminum or other strong metal, but it may alternatively be formed of a rigid polymer or composite. The pin body is about 2 to 6 inches in length, or alternatively about 3 to 4 inches. The cross-section of the body of the pin is round or some other geometry that fits the hole in the lug. The diameter of the pin, when round, is about one-sixteenth to about one-quarter of an inch.

The lug and pin combination are designed to interact with pillar on the truck bed. The truck bed pillar is approximately a hollow square or rectangle. A lug hole is drilled or formed in the inside face of the pillar, that is, the face of the pillar that is parallel with the longitudinal length of the cargo bed and facing the inside of the cargo bed. This lug hole is accessible whether the tailgate is closed or open. The lug hole in the pillar is sized and shaped so that it is slightly larger than the cross-sectional geometry of the lug so that the lug may be inserted into and removed out of the hole and extend into the cavity inside the hollow cargo bed pillar. The lug hole and corresponding lug shape may be bilaterally symmetrical in shape in order to have the hole across the lug perpendicularly aligned across its face when inserted into the pillar to facilitate the pin inserted across the plane of the pillar holes and through the lug body. The lug hole may be positioned anywhere along the vertical height of the pillar. There may be multiple holes along the vertical height of the cargo bed pillar. The existence of multiple holes facilitates the insertion of a lug at various heights, and it facilitates the use of multiple lugs being anchored into the pillar.

The pin hole is another hole in the cargo bed pillar. The pin hole will be matched to substantially the same height as its corresponding lug hole. If there are multiple lug holes, then there need to be the same number of corresponding pin holes. Each pin hole extends through both the back face and the front face of the cargo bed pillar. This way, a pin is inserted into the rear facing hole and through the hollow pillar and out to and/or through the hole on the front side of the pillar. In operation, a lug is inserted into the lug hole, and then a pin is inserted into the pin hole in the rear facing side of the pillar, through the hole across the lug, and then into and alternatively out of the hole in the front facing side of the pillar, thereby locking the lug to the pillar. Then, when the tailgate is closed and locked, the pin is locked in place in the pillar, because the tailgate blocks the pin head from coming out and/or it bears against the pin head and prevents its removal.

The spool can be fixed in any one of multiple positions around the cargo truck bed. The spool may be anchored underneath the cargo bed floor adjacent a hole drilled through or formed in the floor from which the lug and cable can be unwound inside the cargo space. The cargo bed may have one or more toolboxes mounted therein. The spool may be fixed inside a tool box and proximate a hole in the tool box through which the lug and cable may be unwound into the open bed. And, there may be more than one spool mounted around a truck cargo bed so that the cable is near a strategic spot for use.

The drawings show various alternative constructions and locations for the components that make up the locking system. Turning first to FIG. 1, there is shown the back end of a cargo bed 10 including the tailgate 12, sidewalls 14 and the floor 16. Extending out from the floor 16 is a locking cable 18. The spool that holds the cable 18 is not shown, because it is mounted to the floor 16 and underneath the floor. The end of the cable 18 includes a lug 20 that is inserted into and locked into the pillar 24. While the cargo bed 10 is shown with specific designs and contours, the bed could be any vehicle cargo bed.

Figure 2:
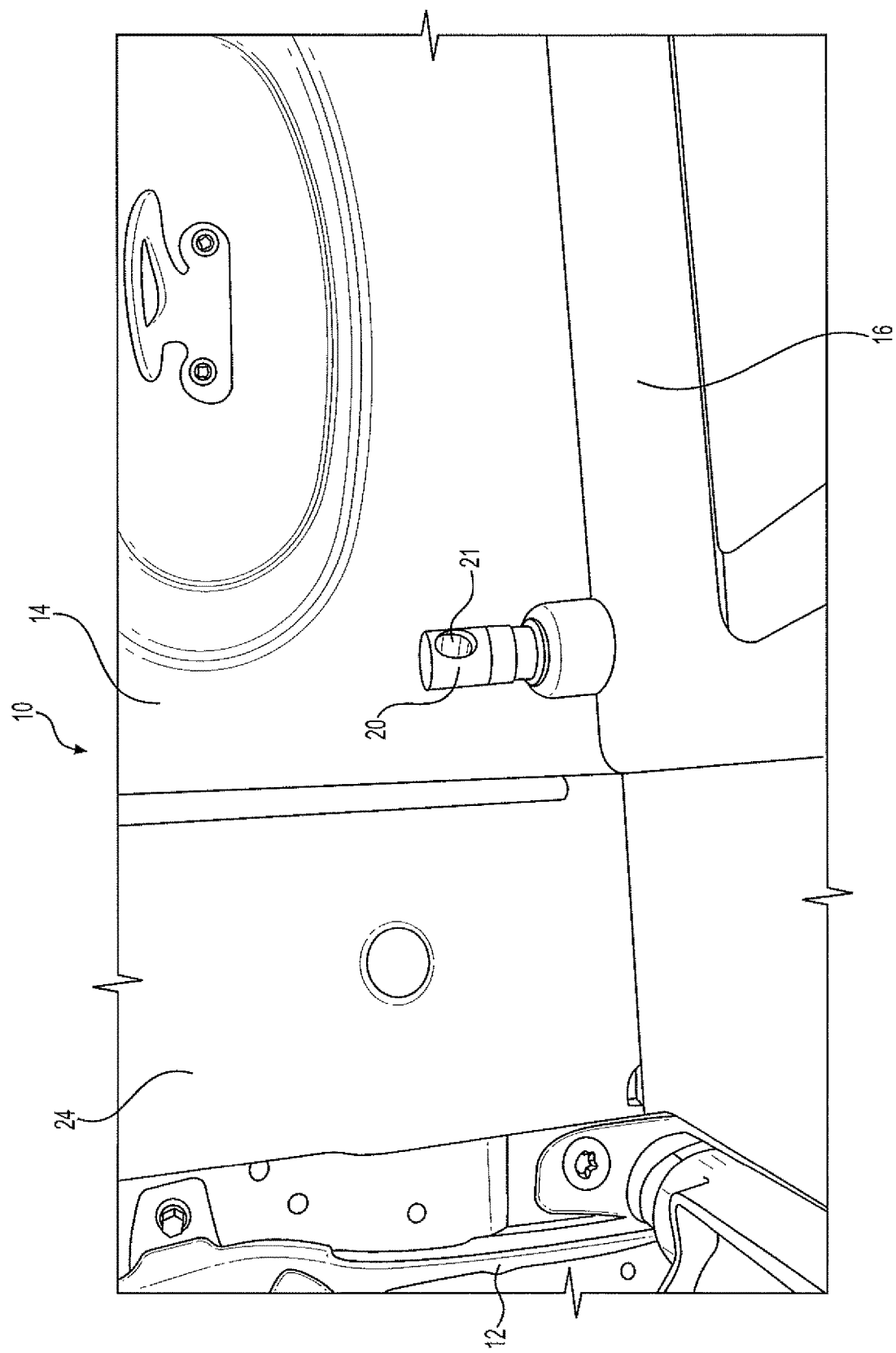
FIG. 2 is a perspective view of the back and bottom corner of a vehicle cargo bed showing the retractable cable as described herein.

FIG. 2 is a close-up perspective view of the back corner of the cargo bed 10 where the locking cable is fully retracted so that only the lug 20 on the end of the cable is visible. The lug 20 has a hole 21 that passes across and through the lug. In this example, the hole 21 in the lug 20 is round in cross section and the lug itself is round in cross section. FIG. 2 also shows portions of the floor 16, sidewall 14, tailgate 12 and pillar 24.

Figure 3:
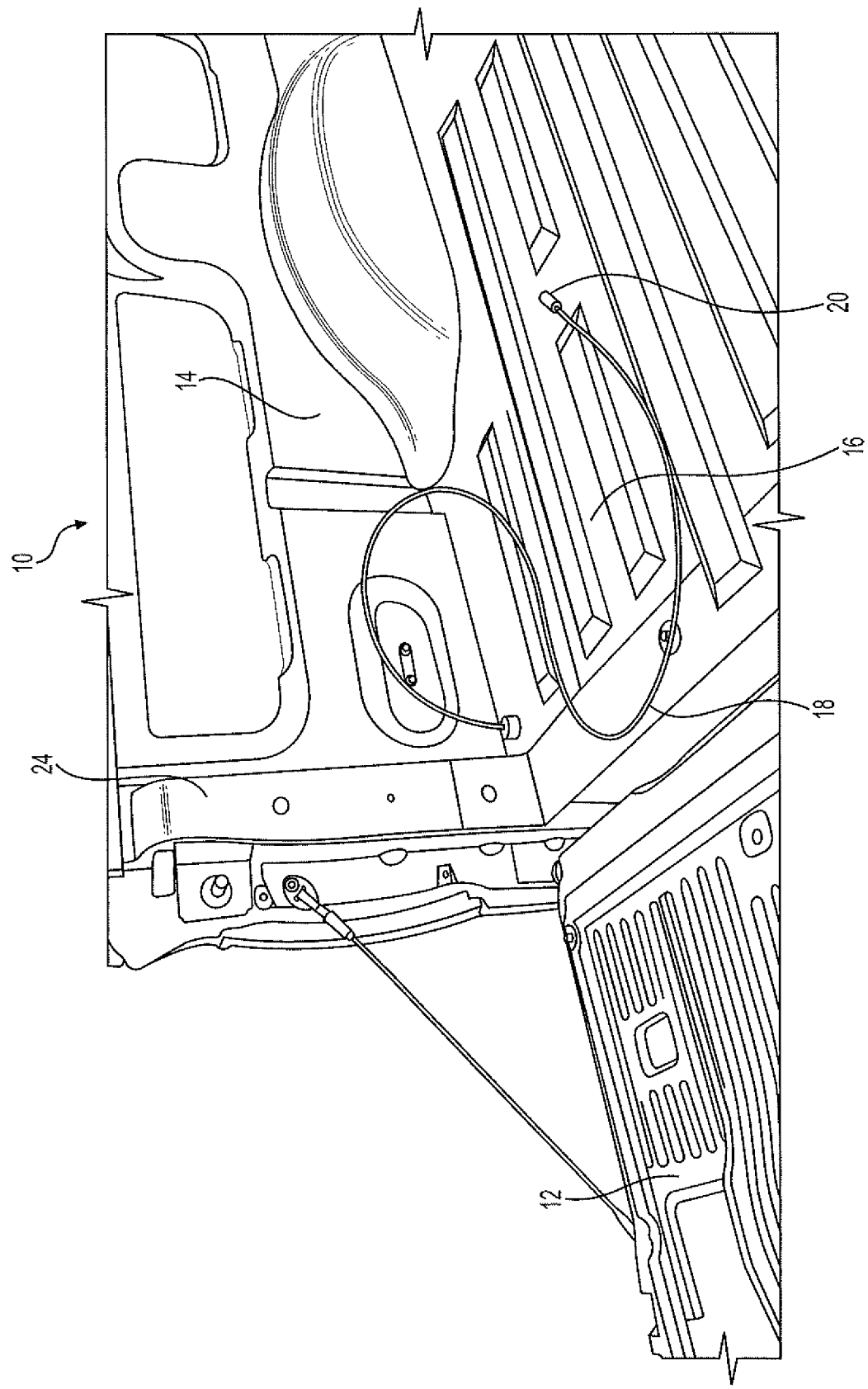
FIG. 3 is a perspective view of one side of the back of a vehicle cargo bed with the tailgate down.

FIG. 3 shows the cargo bed 10, sidewall 14 and floor 16. The tailgate 12 is shown in the down position. The tailgate 12 is rotatably connected proximate the floor 16 and can be rotated up and down between open (down as shown) and up and closed positions. The pillar 24 is positioned at the back corner of the bed 10 and provides support for the sidewall 14 and the tailgate 12 when the tailgate is up and closed. The locking cable 18 is shown in an extended position. The lug 20 is just resting on the floor 16.

In FIGS. 1 and 3, the cable 18 is shown in an extended position from a retractable cable spool. Alternatively, a cable 18 like that shown may be simply fixed to the floor or otherwise to the cargo bed or the vehicle generally so that a length of cable is simply available to lock down cargo as described. Therefore, while a retractable cable is one example, another example of the system described herein is simply an anchored cable that is then able to be locked on its unanchored end to the pillar in the back of a vehicle by using the locking mechanism with the tailgate.

Figure 4:
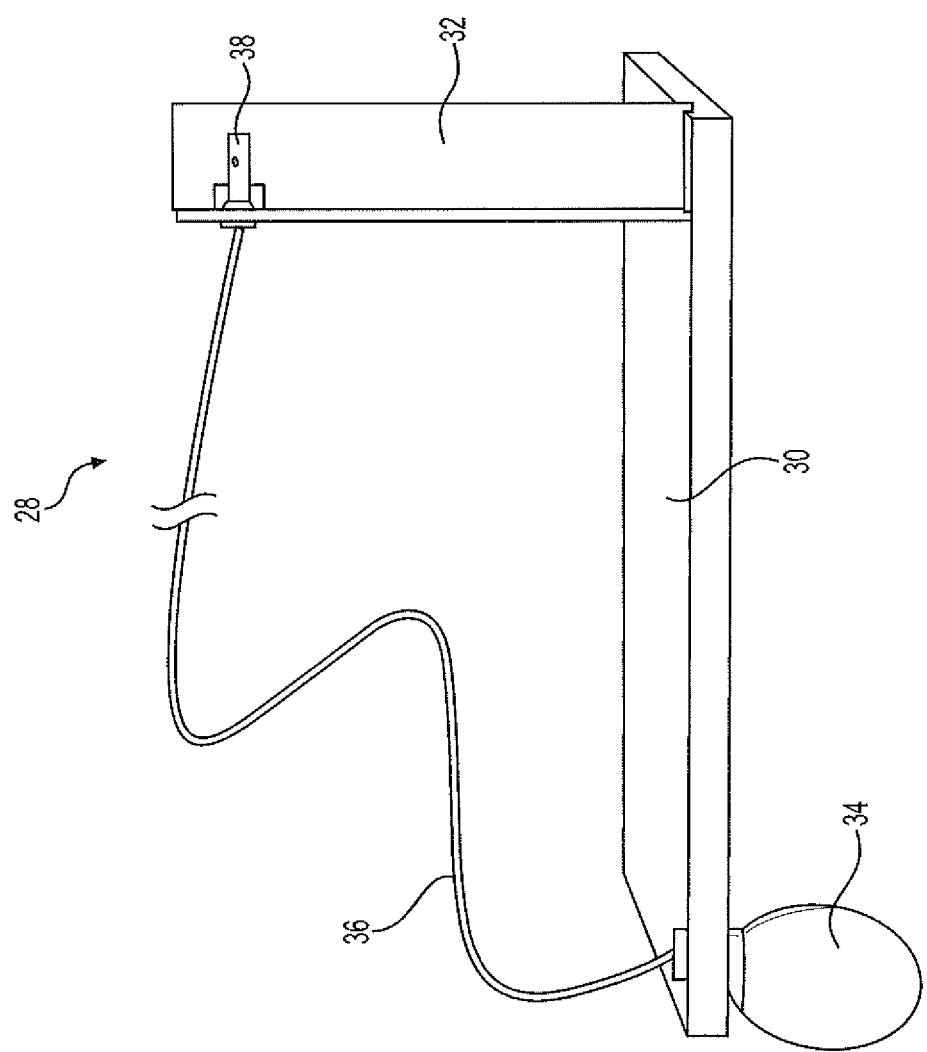
FIG. 4 is a back perspective view of one side of a vehicle cargo bed with the tailgate removed and the cargo bed pillar shown in cross section.
Figure 5:
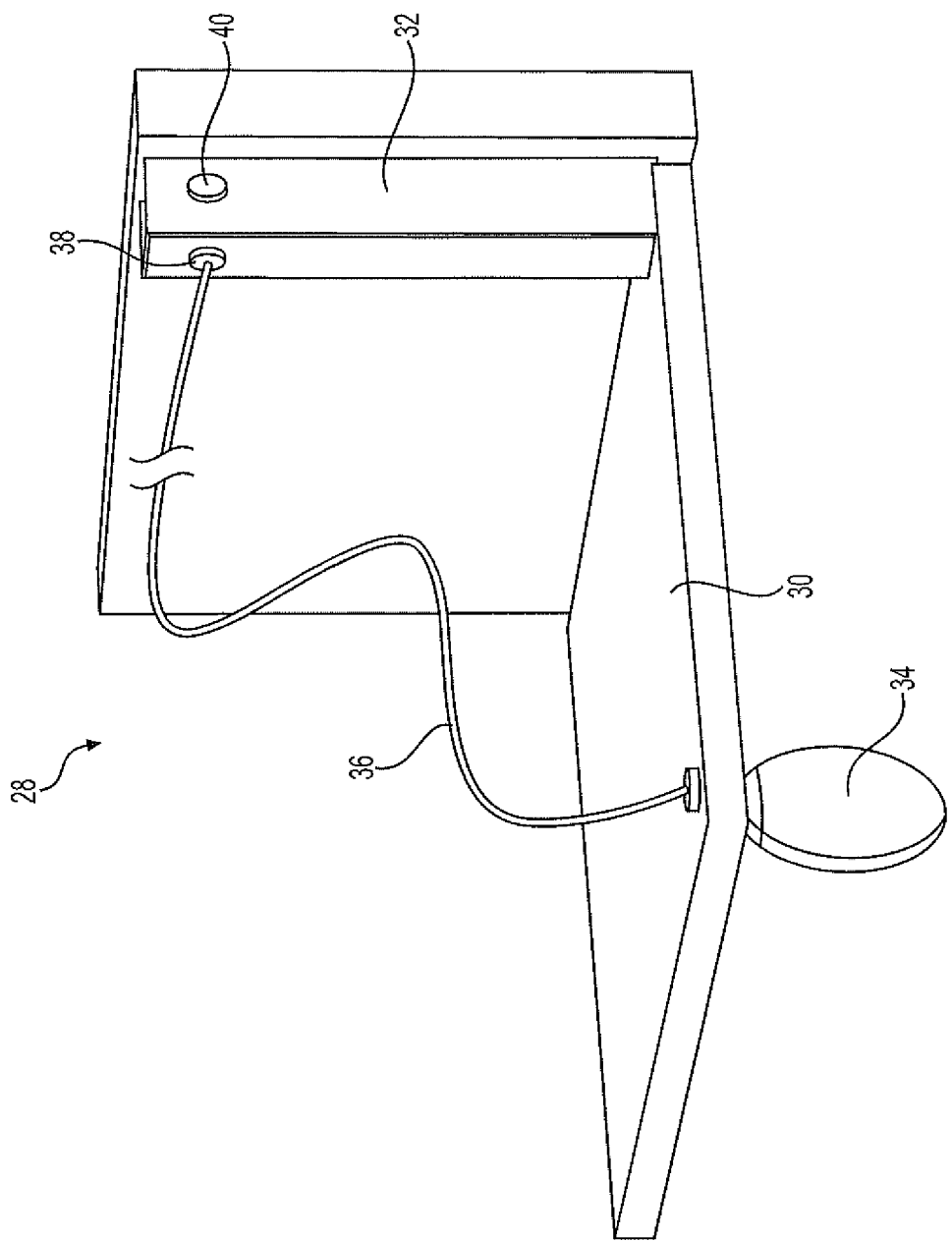
FIG. 5 is another back perspective view of one side of a vehicle cargo bed as shown in FIG. 4 except the pillar is shown in full.
Figure 6:
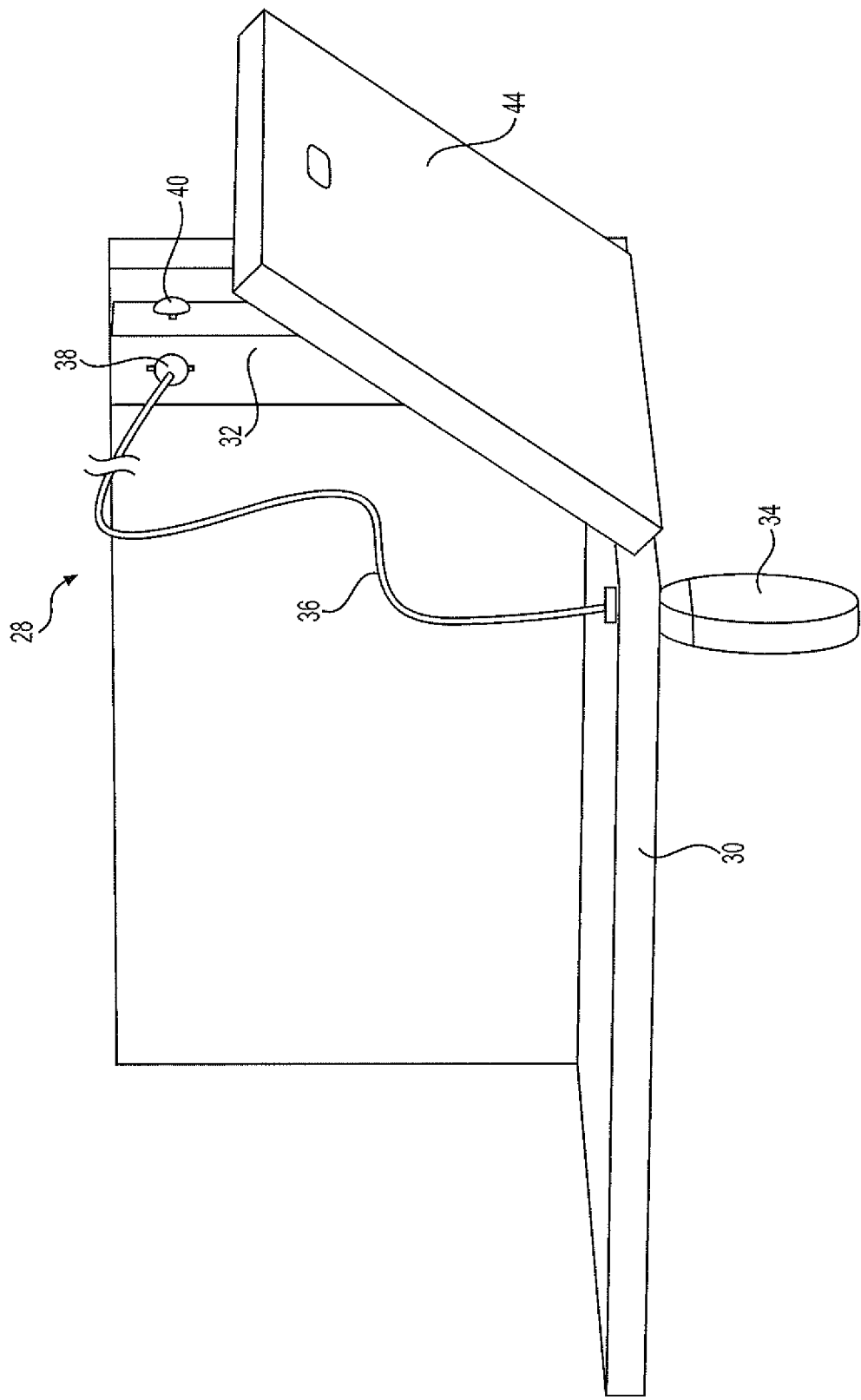
FIG. 6 is a still further back perspective view of a vehicle cargo bed as shown in FIGS. 4 and 5 and further including a tailgate in the partially closed position.

FIGS. 4-6 illustrate views of a portion of another cargo bed 28. In FIG. 4, there is shown simply the floor 30 and a cross sectional view of a pillar 32. A spool 34 is shown mounted underneath the floor 30 with a cable 36 extended above the floor into the cargo space of the cargo bed 28. The lug 38 is inserted into the pillar 32. Similarly, FIG. 5 illustrates the cargo bed 28 with the floor 30 and the full pillar 32. A cable spool is fixed underneath the floor 30. The cable 36 extends from the spool 34 to the pillar 32, with the lug 38 at the end of the cable inserted into the pillar. Also shown in FIG. 5 is a pin 40 inserted into the pillar 32. As will be explained later herein, the pin 40 locks the lug 38 into the pillar 32. FIG. 6 shows the same cargo bed 28 as FIG. 5, but added to the illustration is a tailgate 44. In FIG. 6, it can be seen that the tailgate 44 will close and bear against the pin 40. At the very least it will block the pin 40 and prevent it from being removed from the pillar, thereby retaining the lug 38 in the pillar 32 and locking the end of the cable 36 to the pillar. In use, the cable 36 may be wrapped around or through items placed in the cargo bed 28 and lock them in place.

Figure 7:
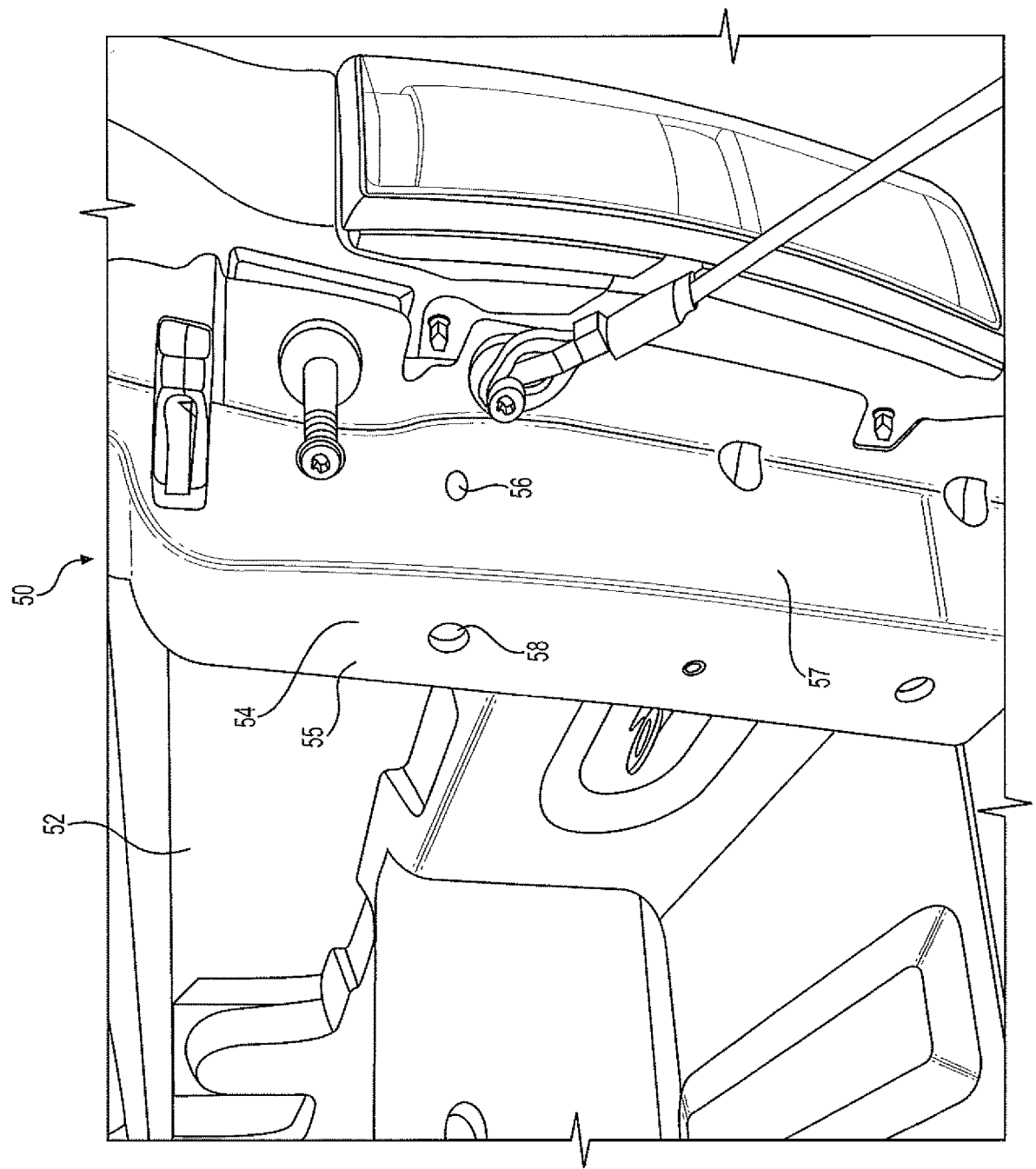
FIG. 7 is a perspective view of a back corner of a vehicle cargo bed.
Figure 8:
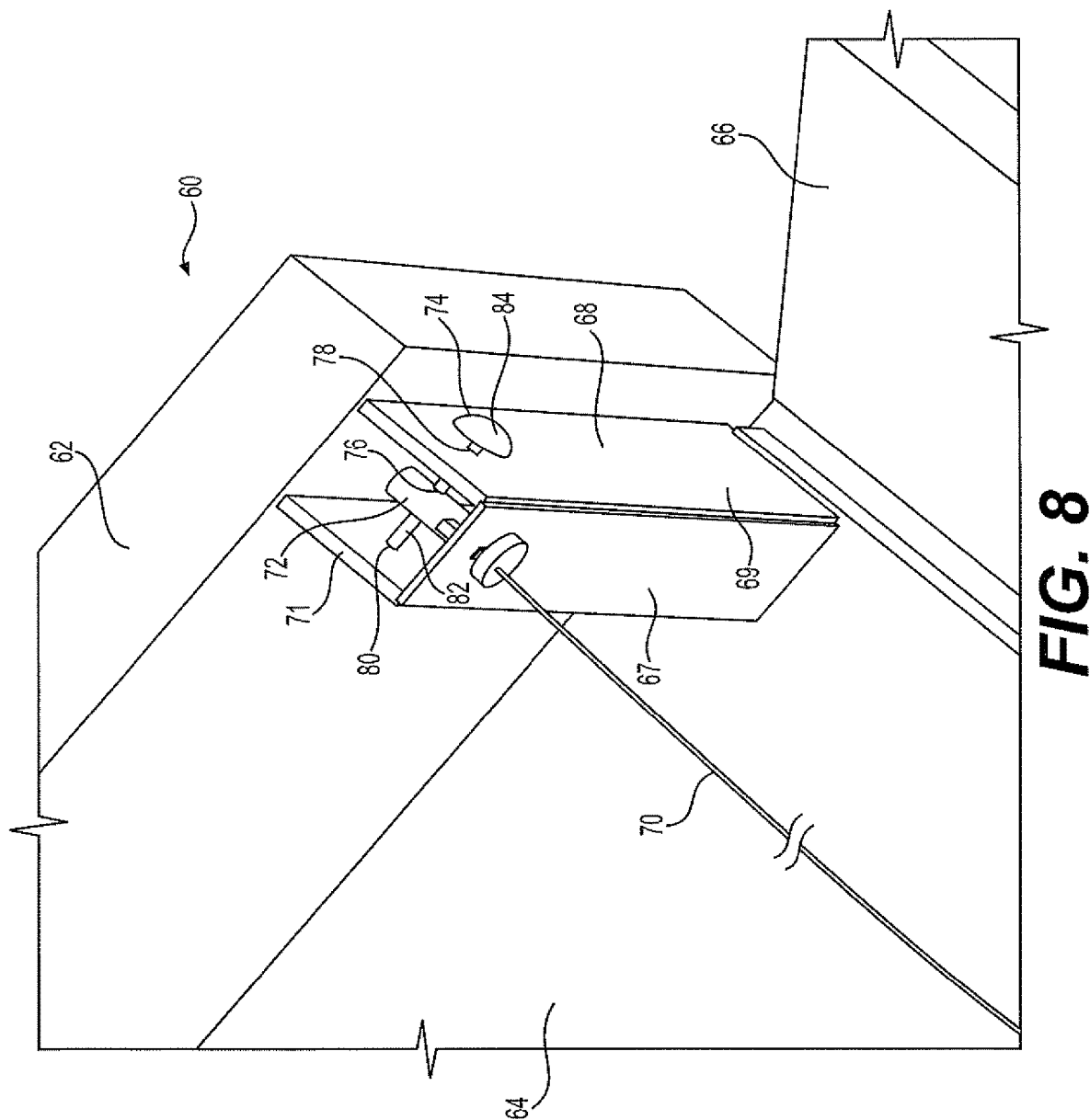
FIG. 8 is a top perspective view of the back corner of a cargo bed showing a cable locked in place in the pillar.

FIGS. 7 and 8 show more closely how a cable may be locked into a pillar. FIG. 7 shows the back corner of a cargo bed 50 with a side wall 52 and a pillar 54. Importantly, shown in the pillar 54 is a lug hole 58 on the inside facing wall 55 of the pillar. The lug hole 55 will receive the lug that is inserted into and extends inside the hollow space inside the hollow pillar 54. At substantially the same vertical height of the pillar 54 as the lug hole 58, there is a pin hole 56 in the bask side 57 of the pillar. The lug hole 58 and the pin hole 56 are the same height on the pillar so that an inserted lug and pin will interconnect inside the pillar. Then, when the tailgate is closed, it secures the pin in place, which in turn locks the lug in place.

FIG. 8 illustrates the back corner of another cargo bed 60. The cargo bed 60 includes a sidewall 62, a floor 64, and a tailgate 66. Also shown is a pillar 68 having a back face 69, and inside face 67, and a front face 71. A lug 72 on the end of the cable 70 is inserted into the inside face 67 of the pillar 68. The lug 72 has a hole 76 across its width. A pin 74 has a body 82 and a head 84 and inserted into the back face 69 of the pillar 68 through pin hole 78. The body 82 of the pin 74 is inserted through the hole 76 in the lug 72. The pin 82 further extends to and into (or through) a second pin hole 80 on the front face 71 of the pillar 68. The pin 74 therefore locks the lug 72 in the pillar 68.

Figure 9:
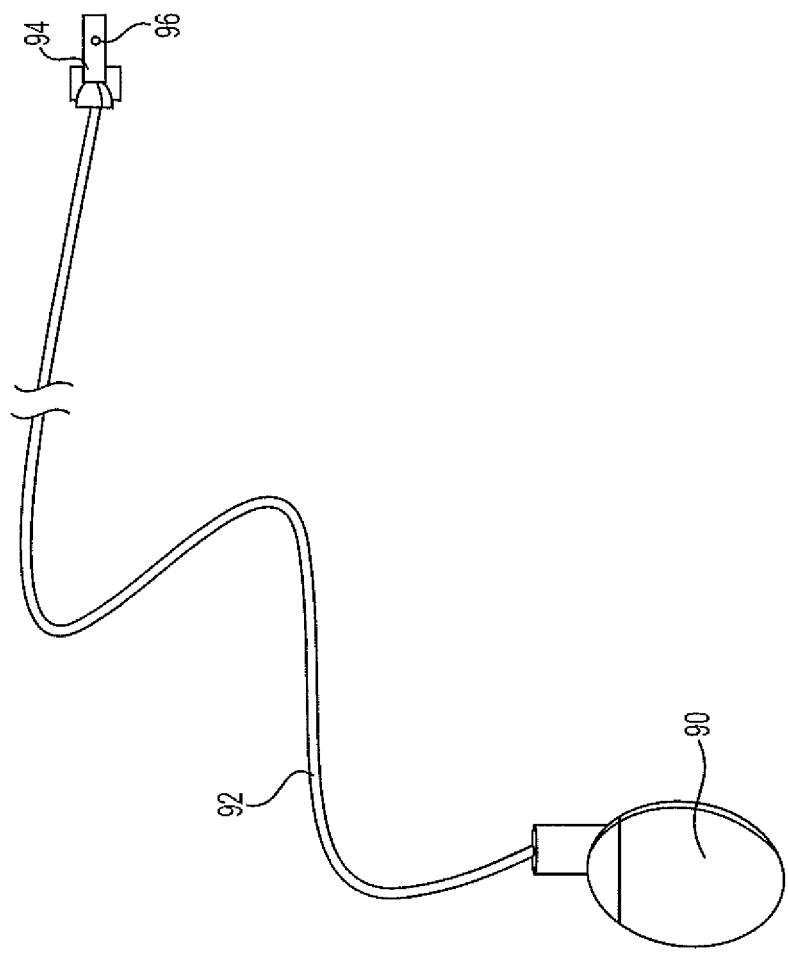
FIG. 9 is a perspective view of a retractable cable.

FIG. 9 shows a retractable cable spool 90 with the cable 92 retracted therefrom. The lug 94 is fixed to the opposite end of the cable 92 that is fixed inside the spool 90. The lug 94 has a hole 96 that extends across it that is a part of the locking system. As noted earlier, the retractable cable spool 90 is one example of the locking system described herein. Instead of the spool 90, the cable may be simply fixed to the cargo bed or toolbox in the cargo bed or otherwise to the vehicle. The cable 92 would then simply be loose in the cargo bed. In one example, there could be some coil strap or other cable management device to manage the cable inside the cargo bed.

Figure 11:
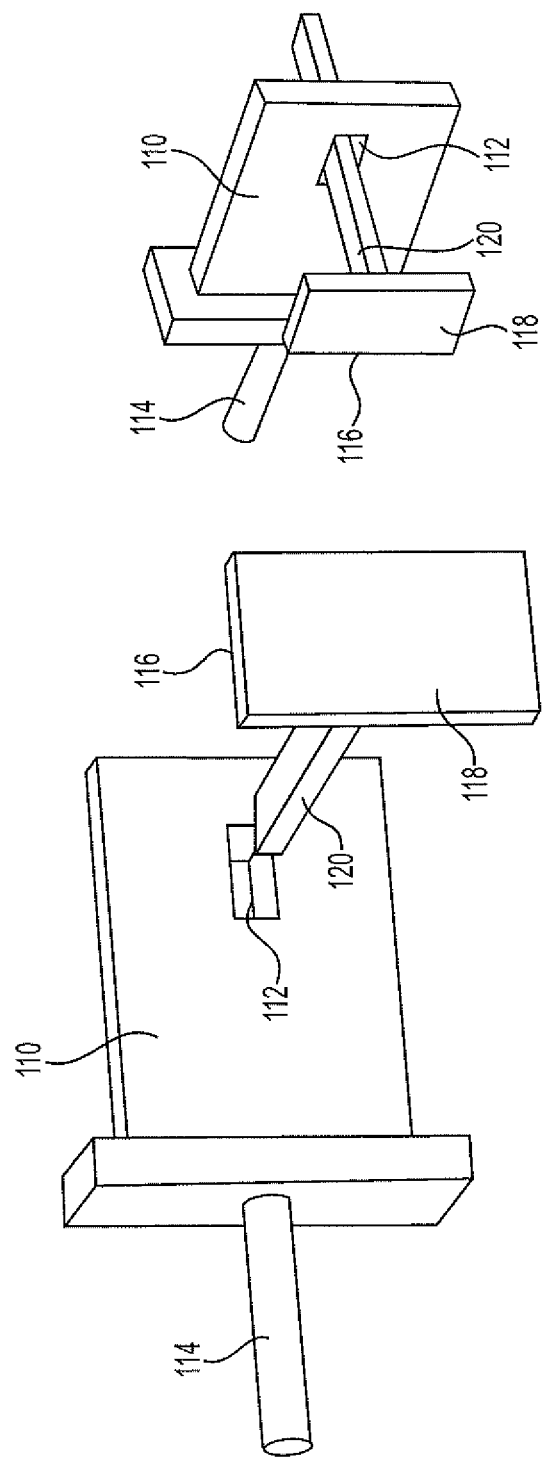
FIG. 11 is two perspective views of a second lug and pin combination as described herein.

FIG. 10 illustrates one style of lug 96 fixed to the end of a cable 92. This lug 94 is round in cross section. The lug 94 has a hole 96 that passes across and through it. A pin 98 is made up of a thin and round body 102 that has a larger pin head 100 on one end thereof. In FIG. 10, the pin 98 is shown both alone and as inserted through the hole 96 in the lug 94. FIG. 10, therefore, illustrates both a round lug 94 and a round pin body 102. This is contrasted with another example of a lug and pin shown in FIG. 11. In FIG. 11, a cable 114 has a lug 110 fixed to an end of the cable. The lug 110 has a rectangular cross section. The lug 110 has a rectangular hole 112 that passes across the lug. A pin 116 has a thin rectangular body 120 and a larger pin head 118. The body 120 of the pin 116 is sized to fit into the rectangular hole 112 of the lug 110 as also shown in FIG. 11. In FIG. 11, therefore, there is shown a rectangular lug 110 and rectangular hole 112 to receive a rectangular pin body 120. In practice, a lug shape, its hole shape and the pin shape may all be varied and change depending on how the system is engineered.

Figure 12:
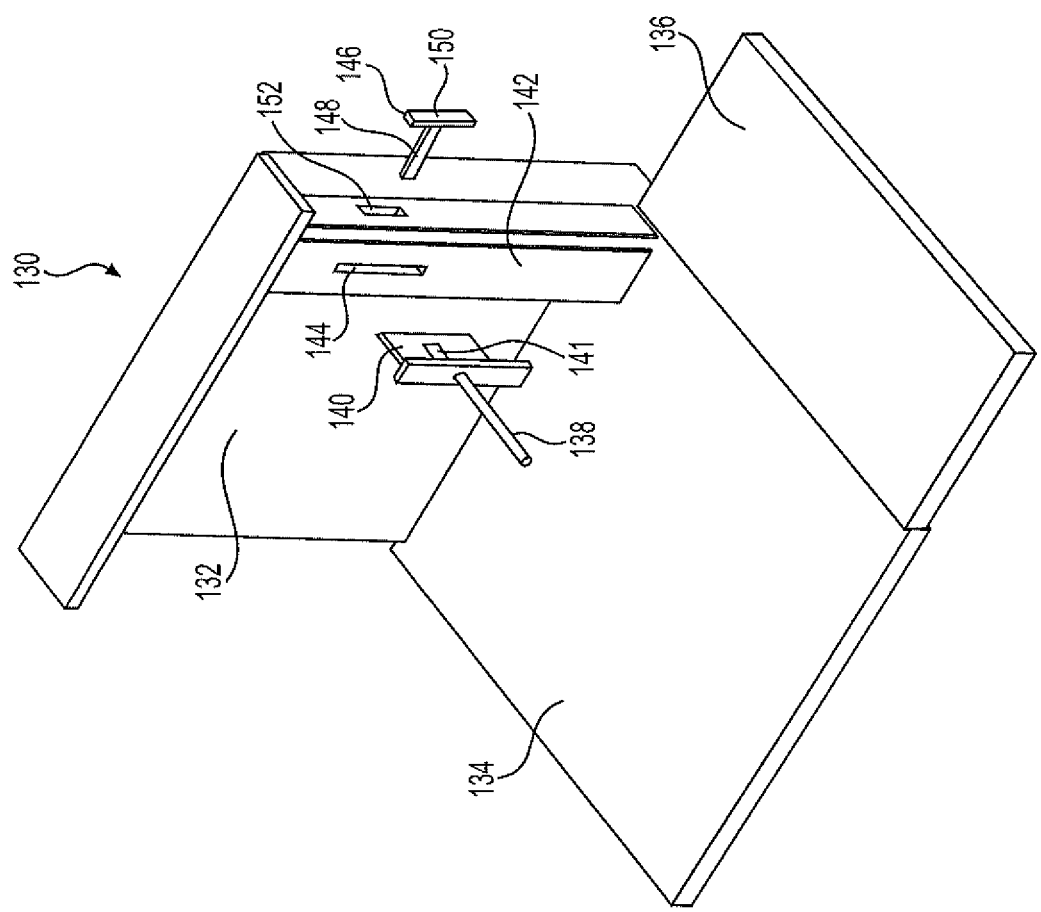
FIGS. 12 and 13 are perspective views of the back corner of a cargo bed showing the cable locking mechanism.
Figure 13:
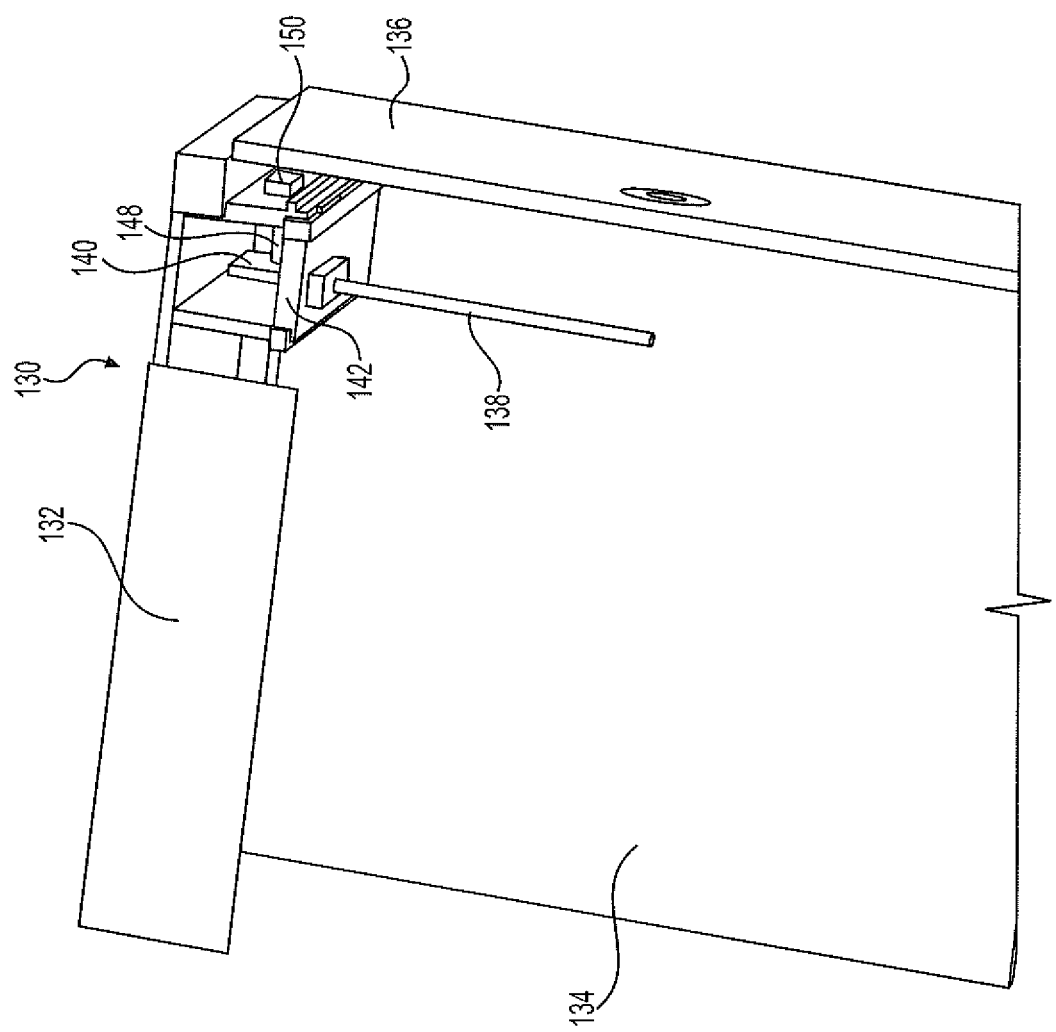

FIGS. 12 and 13 illustrate the back corner of a cargo bed 130 that includes the sidewall 132, cargo bed floor 134, and tailgate 136. The end portion of a cable 138 has a rectangular lug 140 fixed to it. The pillar 142 of the bed 130 has a rectangular lug hole 144 on the inside face of the pillar. A pin hole 152 is found in the back face of the pillar 142. The lug hole 144 and the pin hole 152 are positioned at about the same height on the pillar 142 so that the pin 150 and specifically the body 148 of the pin can be inserted through the pin hole 152 and through the hole 141 in the lug 140 when the lug is inserted into the lug hole. As shown in FIG. 13, when the pin 150 is inserted through the pin hole 152 and through the lug hole 141, then the lug 140 and cable 138 is locked in place when the tailgate 136 is up because the pin is not able to be withdrawn when the tailgate is up.

Figure 14:
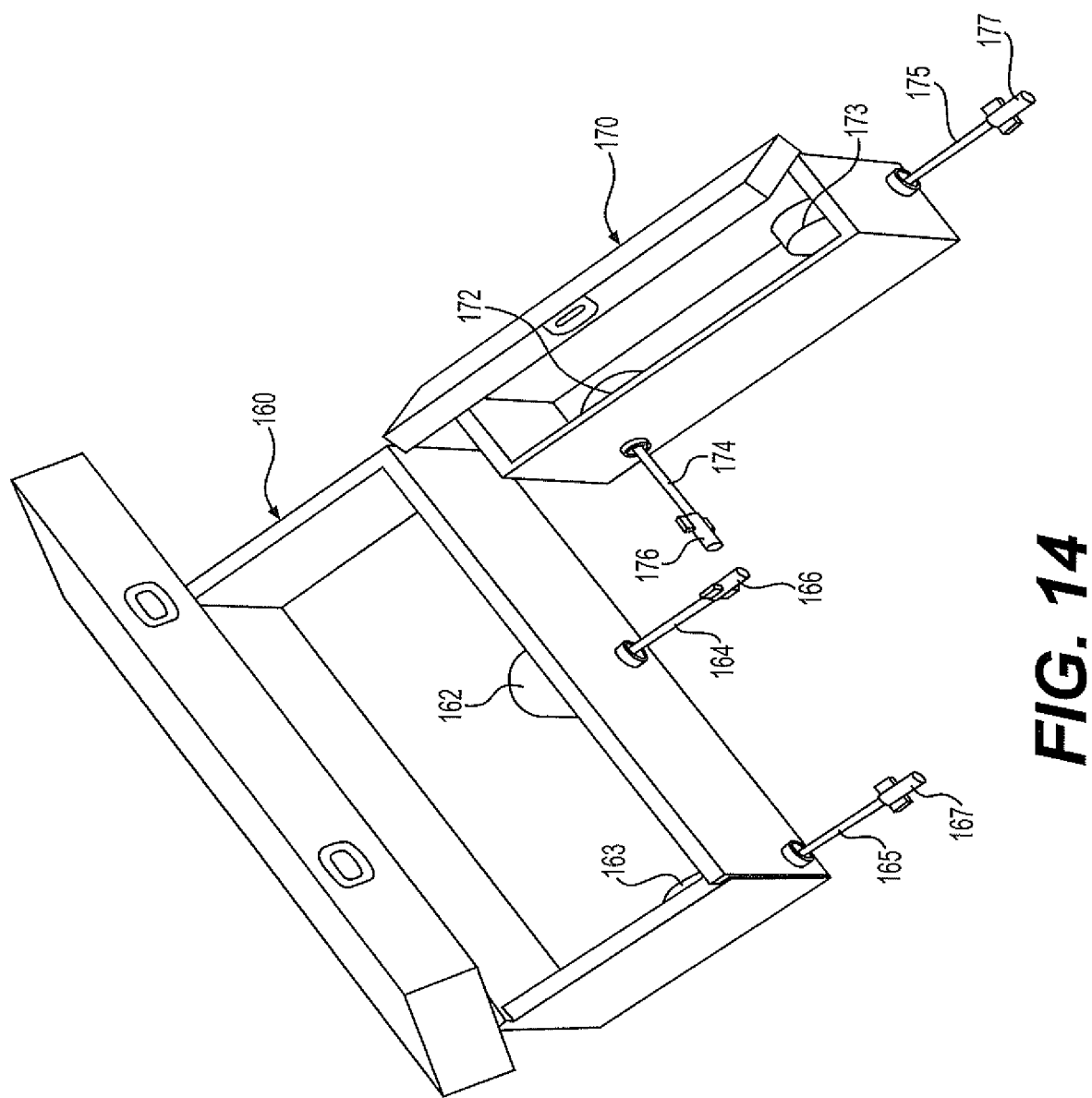
FIG. 14 is a perspective view of vehicle cargo bed toolboxes showing different alternative locations for the retractable cable and spool.

FIG. 14 illustrates that a cable spool like spools 162, 163, 172, and 173 can also be fixed into a tool box like tool boxes 160 and 170 that may be mounted in a cargo bed. Each spool 162, 163, 172, and 173 have a cable 164, 165,174, and 175 and lug 166, 167, 176, and 177 respectively that can be pulled in and out of the respective tool boxes. There can be one or more spools placed in one or more toolboxes. Alternatively, instead of a retractable cable spool as shown, an end of one or more of the cables may simple be anchored or fixed to the toolbox and the loose cable would be managed inside the cargo bed.

Figure 15:
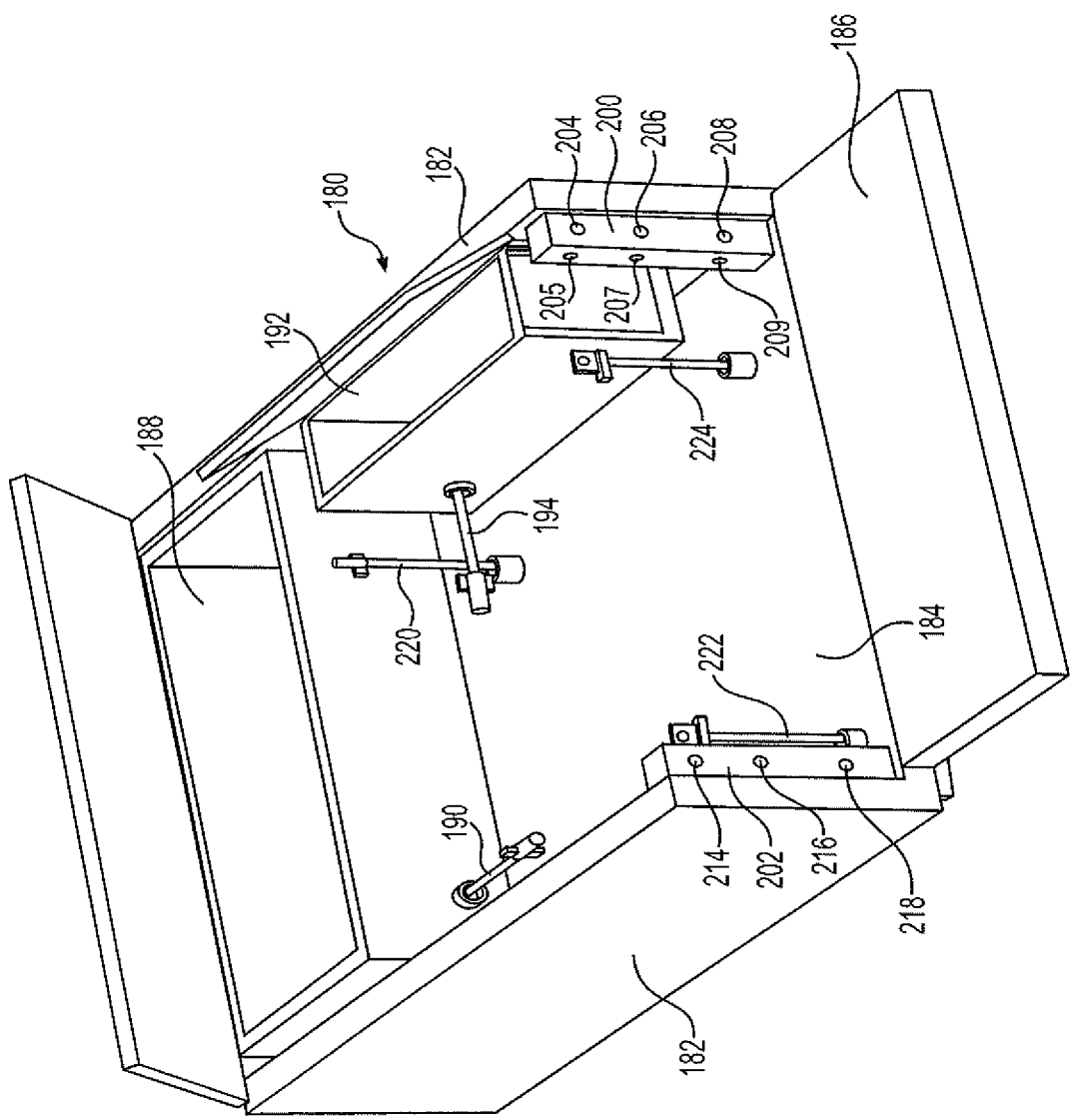
FIG. 15 is a perspective view of a vehicle cargo bed showing different alternative locations of a cable and spool and also different holes on the pillar where a cable may be locked in place.

Finally, FIG. 15 illustrates that the cables and the lug holes in the pillars may be placed in multiple locations or multiple alternative locations. The cargo bed 180 has sidewalls 182, a cargo bed floor 184 and a tailgate 186. Pillars 200 and 202 are positioned in the back corners of the cargo bed 180. In this figure, there are two toolboxes 188 and 192. Toolbox 188 has a cable 190 extending therefrom. Toolbox 192 has another cable 194 extending therefrom. And three different cables 220, 222, and 224 extend up from the cargo bed floor 184 in three different locations on the floor. And pillar 200 has three different lugs holes 205, 207 and 209 and their corresponding pin holes 204, 206 and 208 so that a cable lug may be inserted at different heights on the pillar. Pillar 202 has pin holes 214, 216 and 218 and corresponding lug holes (not shown) so that a lug may be locked at different heights of that pillar as well.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A retractable cable locking system for use with vehicles having a tailgate, the system comprising:
a vehicle having a cargo bed, wherein the cargo bed has a tailgate mounted on one end of the cargo bed and the tailgate having rotating down and latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed;
a cable spool comprising a length of cable retractably configured in the spool, wherein a first end of the cable that is movable away from and back into the spool, and a second end of the cable that is fixed inside the spool;
a lug fixed onto the first end of the cable, the lug having a first size and shape;
wherein the cable spool is attached behind a wall in the cargo bed;
a first hole in the cargo bed substantially the same size and shape as the first size and shape as the lug, thereby allowing the lug and cable to unwind from retract into the cable spool in a cargo space in the cargo bed;
wherein the lug has a second hole across its width;
wherein the cargo bed pillar comprises a lug hole across its width;
wherein the cargo bed pillar has the lug hole therein in a side face of the cargo bed pillar, and this side face of the cargo bed pillar is still open when the tailgate is closed;
a lock pin having a pin body with a second size and shape and a pin head that is larger than the pin body;
wherein the cargo bed pillar having the lug hole in it also has a pin hole in it that is positioned about the same height on the pillar as the lug hole, wherein the pin hole passes through the back face of the pillar and a forward face of the pillar and is substantially the same size and shape as the second size and shape of the lock pin, whereby the pin body is sized to pass through the second hole and across the width of the lug;
whereby the cable pulled from the cable spool and the lug may be inserted into the lug hole and the lock pin is inserted into the pin hole and through the second hole of the lug and then the pin is locked in the pillar when the tailgate is closed.

2. A retractable cable locking system for use with vehicles having a tailgate as described in claim 1,
wherein the cable spool is fixed underneath the floor of the cargo bed.

3. A retractable cable locking system for use with vehicles having a tailgate as described in claim 1,
further comprising a tool box mounted in the cargo bed, and wherein the cable spool is fixed inside the tool box.

4. A retractable cable locking system for use with vehicles having a tailgate as described in claim 1,
wherein the lug is round in cross-section.

5. A retractable cable locking system for use with vehicles having a tailgate as described in claim 1,
wherein the lug is rectangular in cross-section.

6. A retractable cable locking system for use with vehicles having a tailgate as described in claim 1,
wherein the locking pin head has a compressible, scratch-resistant coating.

7. A retractable cable locking system for use with vehicles having a tailgate as described in claim 1,
wherein the pin body is round in cross-section.

8. A retractable cable locking system for use with vehicles having a tailgate as described in claim 1,
wherein the pin body is rectangular in cross-section, and the second hole in the lug has substantially the same cross-section.

9. A retractable cable locking system for use with vehicles having a tailgate as described in claim 1,
wherein the cargo bed pillar has a plurality of lug holes in its vertical height and a corresponding number of pin holes mounted along the corresponding positions as the lug holes along the vertical height of the cargo bed pillar.

10. A cable locking system for use with vehicles having a tailgate, the system comprising:
a vehicle having a cargo bed, wherein the cargo bed has a tailgate mounted on one end of the cargo bed and the tailgate having rotating down and latched positions, and the cargo bed having cargo bed pillars and the tailgate rotates into the latched position when the tailgate is closed onto a back face of the cargo bed pillars, and further wherein the cargo bed comprises a floor that defines the bottom surface of the cargo bed;

a length of cable with a lug fixed onto a first end of the cable, the lug having a first size and shape, and a second end of the cable fixed to the vehicle;

wherein the lug has a hole across its width;

wherein a cargo bed pillar comprises a lug hole across the cargo bed pillar width;

wherein the lug hole is in an inside face of the cargo bed pillar, and this inside face of the cargo bed pillar is still open when the tailgate is closed;

a lock pin having a pin body with a second size and shape and a pin head that is larger than the pin body;

wherein the cargo bed pillar having the lug hole in it also has a pin hole in it that is positioned about the same height on the pillar as the lug hole, wherein the pin hole passes through the back face of the pillar and a forward face of the pillar and is substantially the same size and shape as the second size and shape of the lock pin, whereby the pin body is sized to pass through the second hole and across the width of the lug;

whereby the cable lug may be inserted into the lug hole and the lock pin is inserted into the pin hole and through the hole of the lug and then the pin is locked in the pillar when the tailgate is closed.

11. A cable locking system for use with vehicles having a tailgate as described in claim 10, further comprising a tool box mounted in the cargo bed, and wherein the cable is fixed inside the tool box.

12. A cable locking system for use with vehicles having a tailgate as described in claim 10, wherein the cargo bed pillar has a plurality of lug holes in its vertical height and a corresponding number of pin holes mounted along the corresponding positions as the lug holes along the vertical height of the cargo bed pillar.

* * * * *